United States Patent
Westphal et al.

(10) Patent No.: US 8,512,656 B2
(45) Date of Patent: Aug. 20, 2013

(54) APPARATUS AND PROCESS FOR TREATMENT OF HALOORGANOSILICON COMPOUNDS FROM OFFGASES

(75) Inventors: Ulrich Westphal, Leverkusen (DE); Thomas Leyendecker, Wuppertal (DE); Michaela Maria Schütz, Köln (DE); Mischa Theis, Köln (DE); Dieter Förtsch, Leichlingen (DE)

(73) Assignee: Bayer Intellectual Property GmbH, Monheim (DE)

( * ) Notice: Subject to any disclaimer, the term of this patent is extended or adjusted under 35 U.S.C. 154(b) by 0 days.

(21) Appl. No.: 13/565,112

(22) Filed: Aug. 2, 2012

(65) Prior Publication Data

US 2013/0034486 A1 Feb. 7, 2013

(30) Foreign Application Priority Data

Aug. 5, 2011 (DE) .................. 10 2011 080 533

(51) Int. Cl.
*B01D 53/70* (2006.01)
*B01D 53/96* (2006.01)
*B01J 8/08* (2006.01)
*F28D 17/00* (2006.01)
*F28D 19/00* (2006.01)

(52) U.S. Cl.
USPC ........ 423/210; 423/240 R; 422/178; 422/206; 422/232; 165/4

(58) Field of Classification Search
USPC ............. 423/210, 240 R; 422/178, 206, 232; 165/4
See application file for complete search history.

(56) References Cited

U.S. PATENT DOCUMENTS

2007/0128092 A1 6/2007 Carlowitz et al.
2013/0034486 A1* 2/2013 Westphal et al. ......... 423/240 R

FOREIGN PATENT DOCUMENTS

DE 103 57 696 A1 7/2005

* cited by examiner

*Primary Examiner* — Timothy Vanoy
(74) *Attorney, Agent, or Firm* — Norris McLaughlin & Marcus PA

(57) ABSTRACT

Regenerator and process for regenerative thermal oxidation of offgases comprising halooganosilocon compounds in which offgases are heated in the regenerator, fed to an oxidation zone present in the regenerator to oxidize the haloorganosilicon compounds to $SiO_2$ and hydrogen halides which form a flue gas which is then cooled in the generator to a temperature below its acid dew point and is discharged.

10 Claims, 2 Drawing Sheets

APPARATUS AND PROCESS FOR TREATMENT OF HALOORGANOSILICON COMPOUNDS FROM OFFGASES

The present invention relates to a novel apparatus in the form of a regenerator and to a process executed therein for treatment of offgases comprising impurities in the form of haloorganosilicon compounds.

BACKGROUND OF THE INVENTION

Processes and apparatuses for thermal cleaning of offgases, wherein the offgases are supplied to a heated combustion chamber and oxidized to a flue gas, are known. If non-oxygen-containing offgases are used, the supply of an additional oxidizing agent (e.g. air) is required. Such apparatuses and processes are usually referred to as thermal offgas cleaning. They serve to clean the contaminated offgases.

This cleaning frequently comprises the oxidation of organic substances toward the non-toxic compounds carbon dioxide and water vapour in said flue gas if a recovery is impossible or undesirable.

The cleaning may, in the case of the haloorganosilicon compounds treated in this invention in the offgas, also comprise the oxidation of these substances/compounds toward the halogen-containing flue gases comprising HCl and $Cl_2$, HBr and $Br_2$, and HI and $I_2$, as well as the aforementioned compounds carbon dioxide and water vapour. The gas formed after the oxidation is referred to as flue gas. The conversion products mentioned are thus present in the flue gas.

For economically viable operation of such an apparatus, in the vast majority of cases, further utilization of the reaction enthalpy typically released by the oxidation is provided, which is present in the form of tangible energy of the hot flue gas after the oxidation. One possible use thereof is for preheating of the offgases to be treated in order to reduce the fuel requirement of the overall process.

Extremely high offgas preheating temperatures and hence low fuel consumptions can be achieved by what is called regenerative offgas preheating based on cyclically switchable storage beds.

This involves heating the offgas to be cleaned in a hot regenerator, in the course of which the latter is cooled. The heated offgas subsequently enters an oxidation zone in which constituents of the offgas are oxidized at temperatures in the range from typically 800° C. to 1200° C. The hot flue gas thus obtained is subsequently by means of a cold regenerator, as a result of which the latter is heated and the flue gas is cooled. This process is periodically reversed by switching the flow direction, such that only the temperature profiles shift in the regenerators.

This is referred to as an RTO process (regenerative thermal oxidation) and an RTO plant (cf., for example, VDI-Richtlinie [Association of German Engineers guideline] 2442: "Abgasreinigung—Verfahren and Technik der thermischen Abgasreinigung" [Waste gas cleaning—Methods of thermal waste gas cleaning], updated: March 2006).

Numerous processes, however, give rise to offgases which comprise dust-forming constituents inter alia, for example organosilicon compounds. In this case, use of the RTO plants and processes has to date been opposed by the fact that the plant becomes covered and hence blocked by the oxidation products in the flue gas (predominantly $SiO_2$) formed from the organosilicon compounds in the offgas.

The offgases comprising haloorganosilicon compounds treated according to the present invention typically result, in the course of oxidation, in the formation of highly corrosive conversion products in the flue gas.

Such conversion products are, in combination with the oxidation product water or water vapour (see above), especially HCl when the halogen is chlorine and this is present in the flue gas. The other conversion products in the flue gas comprising the halogen from the haloorganosilicon compounds, such as HBr and HI, also form extremely corrosive acids (e.g. hydrochloric acid) in the flue gas together with the water vapour produced.

This is especially true when, during the process, the temperature in the apparatus goes below the dew point of the components in the flue gas as a result of cooling over the heat storage material.

The aforementioned dew point is referred to as the acid dew point since it corresponds to the dew point of the acid relevant in each case (for example dilute hydrochloric acid from HCl) and is typically much higher than the dew point of water without the presence of acid-forming components. The result of this is that, in the course of cooling of said flue gases, condensation occurs significantly earlier than would be expected without the acid-forming components.

If the haloorganosilicon compounds in the offgas also comprise sulphur atoms as well as the aforementioned halogens, there is additionally also formation of conversion products in the form of $SO_2$ and/or $SO_3$ in the flue gas, which, in conjunction with water, form the likewise extremely corrosive compounds $H_2SO_3$ (sulphurous acid) and $H_2SO_4$ (sulphuric acid) when the temperature goes below the acid dew point of a flue gas comprising such compounds.

The aforementioned conversion products in the flue gas, in combination with the water vapour, mean that essential apparatuses in such a plant must consist of a material which can withstand both the temperatures therein and the corrosion. Especially in the case of prolonged operation of the process, this, however, is impossible under economic conditions.

The offgas treated is thus a substance mixture which is not a product of value as such and therefore cannot justify great investment in the apparatus for treatment. Therefore, the apparatus has to be cleaned or replaced at regular intervals if the aforementioned blockage and corrosion have reached a no longer acceptable degree.

In addition, it should be ensured that—in order to avoid corrosion—the temperature does not go below the acid dew point of the flue gas in the plant in order to at least minimize corrosion and thus to prolong operating time and increase availability. This, however, requires higher preheating temperatures for the offgas and hence high additional operating costs to achieve these high preheating temperatures.

A significant constituent of the aforementioned RTO plants is a heat exchanger as an apparatus for recovery of the aforementioned reaction enthalpy from the oxidized flue gas stream. The heat exchanger in such processes/plants is configured as a regenerator.

A regenerator is a heat exchanger in which input of (thermal) energy and output of (thermal) energy are decoupled from one another in terms of time.

In order to achieve such decoupling in terms of time, the (thermal) energy in such regenerators is stored in a heat storage material, which is typically a solid with a high specific heat storage capacity ($c_p$, expressed in J/(kg·K)), by contacting a gas (the flue gas here) at high temperature with this heat storage material, as a result of which the gas is cooled and the heat storage material is correspondingly heated.

In a second step, a gas to be preheated (the offgas here) is then contacted with the heated heat storage material, as a result of which the heat storage material is in turn cooled and the desired preheating of the gas is achieved.

If the heat storage material used does not have sufficiently high specific heat storage capacity, this can be compensated for by a correspondingly increased mass of heat storage material, such that a sufficiently high heat storage capacity is present overall. The heat is transferred from the flue gas to the heat storage material and back to the offgas via the surface of the heat storage material, and so heat storage shapes having a high surface-to-volume ratio are typically used. Such shapes are, for example, monoliths (e.g. honeycombs) or beds of various kinds (e.g. saddles, Berl saddles or balls).

For regenerators in RTO plants for the treatment of organosilicon compounds, ball-shaped random packings in particular are advantageous to a certain degree because they can also be executed in embodiments in which the heat storage material is in the form of beds.

Such beds have the advantage that they can be moved within the regenerator. This facilitates the exchange of the heat storage material.

The amount of heat storage material correlates directly with the necessary volume of the regenerator, which in turn correlates directly with the capital costs. This is not the only reason why such regenerators with beds in RTO plants which, as explained above, do not treat products of value are highly economically advantageous.

Furthermore, the heat storage material, in the specific case of plants which treat the offgases comprising haloorganosilicon compounds relevant in the present invention, due to the aforementioned baked-on material resulting from $SiO_2$ from the flue gas, has to be freed of this baked-on material at regular intervals in order that the regenerator still fulfils the desired function.

This recurrent maintenance, in the case of regenerators with heat storage materials which are not beds (for instance those in the form of honeycombs), causes the deinstallation of the heat storage material from the regenerator, the cleaning thereof, and then reinstallation.

If it is possible to make the time delay between the heating operation of the heat storage material and the cooling operation of the heat storage material sufficiently long, i.e. to keep a certain period free between the cooling and later heating, this maintenance can be accomplished during this period.

Typically, however, this is impossible and the cost and inconvenience is in many cases unacceptable, both in terms of the working conditions and in terms of labour. In this context, many manufacturers of such plants, in their technical tender documents, have to date excluded the treatment of offgases comprising organosilicon compounds.

A regenerator with such a bed for use in an RTO plant and a process for operation thereof in connection with offgases comprising organosilicon compounds, which form the aforementioned deposits from the flue gas, is described in DE 103 57 696.

DE 103 57 696 discloses, more particularly, a process for thermal cleaning of offgases comprising aforementioned organosilicon compounds, in which a regenerator with a bed is used, the bed being withdrawn periodically from the regenerator for the purpose of cleaning to remove the deposits.

As described in DE 103 57 696, the cleaning to remove the deposits is not effected during the normal operation of the RTO plant but during a break in operation in which cleaning of the offgases is impossible and hence the availability of offgas cleaning is restricted. Nevertheless, the withdrawal of beds is several times easier than the deinstallation of any internals in the regenerator, for example monolithic heat storage materials.

The offgases treated in DE 103 57 696, however, do not include haloorganosilicon compounds.

One disadvantage associated with the aforementioned beds is that the bed as such has an abrasive effect on the apparatus in which it is present, since the bed, in the course of withdrawal from and charging of the regenerator, galls on the inner surface of the regenerator and can thus lead to material removal at the inner surface thereof In combination with the aforementioned haloorganosilicon compounds in the offgas which lead to corrosive conversion products in the flue gas, it is exactly this abrasive action that is particularly problematic since this activates the surface of the apparatus and thus promotes corrosion. This is especially true when the temperature goes below the acid dew point of the flue gas as a result of cooling thereof in the course of the process, as a result of which the aforementioned particularly corrosive conversion products are formed, which attack and damage the apparatus.

DE 103 57 696 thus solves the problem of the economically simpler cleaning of the heat storage material, but leads to further problems in conjunction with the treatment of offgases comprising haloorganosilicon compounds.

These problems relating especially to the possibility of industrial exploitation of the heat content of the hot flue gas comprising water vapour and conversion products of the haloorganosilicon compounds.

The apparatus known from DE 103 57 696 and the process described therein are unable to treat such haloorganosilicon compounds in a viable manner since either the outlet temperature of the flue gases from the apparatus has to be set so high that the temperature reliably does not go below the acid dew point, which prevents complete utilization of the energy content of the hot flue gas, or since, on the other hand, the apparatus, when the temperature goes below the acid dew point, cannot be operated to an economically acceptable degree as a result of the occurrence of corrosion.

Proceeding from the above-described problem of the prior art, it is therefore an object of the present invention to provide an apparatus and a process which retains the advantages according to DE 103 57 696 with regard to the more economic maintenance of the regenerator, but at the same time enable treatment also of offgases comprising haloorganosilicon compounds.

SUMMARY OF THE INVENTION

The above object is achieved by a regenerator for treatment of an offgas comprising haloorganosilicon compounds, the offgas being heated by means of a heat storage material in the form of a bed and an outlet for the heat storage material being present in the regenerator, this outlet being connected to a separation apparatus for removal of adhering oxidized silicon-containing material and the separation apparatus being connected to an inlet which allows the heat storage material to be fed back to the regenerator, characterized in that the regenerator is provided with an internal multilayer coating which comprises, in the sequence from the inside of the regenerator outward, a) a first layer of a ceramic material comprising aluminium oxide ($Al_2O_3$) and silicon oxide ($SiO_2$) in which aluminium oxide ($Al_2O_3$) and silicon oxide ($SiO_2$) are present at least partly as a mullitic and/or spinel crystal, b) a second layer of a further ceramic material comprising aluminium oxide ($Al_2O_3$) and silicon oxide ($SiO_2$) in which aluminium oxide ($Al_2O_3$) and silicon oxide ($SiO_2$) are present at least partly in the form of a mullitic crystal and this mullitic crystal is at least partly embedded into an amorphous phase of silicon oxide ($SiO_2$),
c) a third layer comprising foamed, amorphous silicon oxide ($SiO_2$) with closed porosity and
d) optionally a fourth layer comprising a vinyl ester resin with woven glass fabric and/or woven carbon fabric.

DETAILED DESCRIPTION

Haloorganosilicon compounds in the context of the present invention relate to those compounds which comprise direct silicon-carbon bonds and halogen atoms (e.g. chlorine, iodine, bromine) Also in accordance with the invention, however, are compounds in which the carbon is bonded to the silicon via oxygen, nitrogen or sulphur atoms and which also comprise at least one halogen atom.

The inventive ceramic material of the first layer typically has a thermal conductivity in the range from 1 to 2.5 W/(m·K) and a coefficient of thermal expansion in the range from $3 \cdot 10^{-6}$ to $9 \cdot 10^{-6}$ $K^{-1}$. The density is typically in the range from 1000 to 3000 $kg/m^3$.

Preferred ceramic materials of the first layer also have a mass ratio of aluminium oxide to silicon oxide in the range from 0.6 to 2.0.

Particularly preferred ceramic materials of the first layer have a mass ratio of aluminium oxide to silicon oxide in the range from 1.4 to 1.9.

Likewise preferred ceramic materials of the first layer have a thermal conductivity in the range from 1.3 to 2 W/(m·K) and a coefficient of thermal expansion in the range from $4 \cdot 10^{-6}$ to $7 \cdot 10^{-6}$ $K^{-1}$. The density is preferably in the range from 2200 to 2700 $kg/m^3$.

The aforementioned inventive and preferred ceramic materials of the first layer are advantageous because such materials are particularly heat-resistant and at the same time durable both with respect to corrosion and to abrasion at very high use temperatures of up to 1700° C. However, these ceramic materials have open porosity, and so they are unable to retain conversion products present in the flue gas.

The inventive further ceramic material of the second layer typically has a thermal conductivity in the range from 0.1 to 1 W/(m·K) and a coefficient of thermal expansion in the range from $1 \cdot 10^{-6}$ to $8 \cdot 10^{-6}$ $K^{-1}$. The density is typically in the range from 300 to 1600 $kg/m^3$.

Preferred further ceramic materials of the second layer also have a mass ratio of aluminium oxide to silicon oxide in the range from 0.15 to 3.4. Particularly preferred further ceramic materials of the second layer have a mass ratio of aluminium oxide to silicon oxide in the range of 0.6 to 0.9.

Likewise preferred further ceramic materials of the second layer have a thermal conductivity in the range from 0.1 to 0.5 W/(m·K) and a coefficient of thermal expansion in the range from $1 \cdot 10^{-6}$ to $7 \cdot 10^{-6}$ $K^{-1}$. The density is preferably in the range from 400 to 1100 $kg/m^3$.

The aforementioned inventive and preferred further ceramic materials of the second layer are advantageous because such materials are heat-resistant and at the same time durable with respect to corrosion at very high use temperatures of up to 1350° C. However, these further ceramic materials also have open porosity, and so these too are unable to retain conversion products present in the flue gas.

The foamed, amorphous silicon oxide ($SiO_2$) of the third layer typically has a thermal conductivity in the range from 0.3 to 0.1 W/(m·K) and a coefficient of thermal expansion in the range from about $5 \cdot 10^{-6}$ to $10^{-5}$ $K^{-1}$.

The foamed amorphous silicon oxide ($SiO_2$) of the third layer has, in accordance with the invention, closed pores and is thus able to retain conversion products present in the flue gas. It is thus impervious to diffusion of the conversion products. It is additionally durable to corrosion by the aforementioned conversion products of the flue gas at use temperatures of up to 350° C.

The third layer thus protects any regenerator wall present immediately behind this layer from the conversion products in the flue gas, such that there is no longer any risk of corrosion thereof as a result. The regenerator wall can therefore be manufactured from an inexpensive, comparatively simple, steel durable with respect to temperatures of not more than 180° C.

The combination of the at least three aforementioned layers in the aforementioned inventive sequence has the advantageous effect that adjusting them in terms of their thermal conductivity, and in terms of their corrosion and abrasion resistance at occasionally very high temperatures in the region of above 1500° C. within the regenerator in the course of reaction of the offgases to give flue gases, forms a material composite which enables operation of the regenerator too in a lasting manner with offgases comprising haloorganosilicon compounds.

Likewise matched to one another are the coefficients of thermal expansion, the effect of which is that the temperature gradient which occurs from interior to regenerator wall does not lead to stresses at the layer boundaries, which in turn ensures the lasting operability of the regenerator and more particularly imperviosity of the multilayer composite.

More particularly, a temperature gradient established over the inventive layers permanently rules out material failure of the regenerator vessel even under the adverse conditions of the regenerative thermal oxidation of haloorganosilicon compounds.

A further advantage which is achieved in accordance with the invention is that especially the first two layers of the inventive regenerator, taken alone, simultaneously also act as heat storage material, as a result of which the regenerator, through the reduced amount of heat storage material to be introduced additionally, can be manufactured in a smaller size and hence less expensively. Moreover, the layer composite, in accordance with the invention, also acts as a thermal insulation material, which minimizes the heat loss and hence makes the process executed in the regenerator more energy-efficient.

One result of this enhanced energy efficiency is an economic benefit through the reduced amount of fuel gas which has to be burnt in any burner provided in the regenerator.

It is therefore possible to entirely dispense with the operation of a burner when the offgas has a sufficiently high loading of haloorganosilicon substances because the reaction enthalpy released by oxidation is then sufficient to achieve flue gas temperatures which heat the regenerator to such a high level that offgas introduced is heated to a sufficient degree that no further energy need be expended to overcome the activation energy of the oxidation.

For safe, permanent operation of the regenerator, however, in a first preferred development of the inventive regenerator, a burner present in the top space of the regenerator, in the event of low offgas loadings, in the course of startup of the plant, in the case of operating faults or operating variations in the volume and composition of the offgas, is able to provide any energy additionally required.

In a second preferred development of the present invention, the fourth layer comprising a vinyl ester resin with woven glass fabric and/or woven carbon fabric is present.

This fourth layer is advantageous because it is firstly durable at the maximum temperatures of about 180° C. which can still occur beyond the first three layers, and at the same time is also resistant to corrosion by the conversion products in the flue gas. Furthermore, it is—like the third layer—impervious to diffusion of the aforementioned conversion products in the flue gas. This fourth layer in the preferred development thus serves to further safeguard the metallic regenerator wall against corrosive attack by the conversion products in the flue gas.

In a third preferred development of the present invention, the inventive regenerator comprises a fifth layer comprising vermiculite material and/or kieselguhr between the second layer and the third layer.

This fifth layer between the second and third layers has the advantage that these materials typically have small pores and thus reduce the diffusion pressure of the corrosive conversion products of the flue gas on the third layer. Just like the material of the second and third layers, these materials have lasting resistance to the corrosive action of the conversion products from the flue gas at temperatures of about 300° C. to 500° C.

As well as the first and second layers, the other layers also act as heat storage material in the regenerator. Hereinafter, layers are also referred to collectively as stationary heat storage material of the inventive regenerator.

The heat thus stored in the stationary heat storage material allows continuous discharge of the heat storage material in the form of a bed, without significant cooling and heat losses. The operation of the process described hereinafter can therefore be converted to an essentially continuous process.

If the process according to the invention described below is thus operated continuously, it is also possible to withdraw the heat storage material present in the form of the bed in the process continuously or periodically from the inventive regenerator during the operation of the process, and to feed it back thereto. As described below, the feeding is effected at the top of the regenerator, and the withdrawal at the base thereof.

Both for the withdrawal and for the feeding of the heat storage material present in the form of a bed, a corresponding feeding and withdrawal apparatus is provided in each case in the regenerator.

This feeding and withdrawal apparatus is characterized in that it comprises a lock system in which a space bounded by two closure apparatuses is formed, these closure apparatuses providing gas-tight sealing with respect to the wall through a sealing means. Said sealing means may, for example, be a rubber ring, a graphite seal as is common knowledge to the person skilled in the art in the field of apparatus technology, or the like.

At the surface of the stationary storage material, and also on the bed within the regenerator, oxidized silicon accumulations form, but these are removed by the bed and the abrasive action thereof in the operation of the inventive regenerator, and so there are no significant layers of the oxidized silicon accumulations here, which is likewise only enabled by the abrasion-resistant execution of the first layer, without any need for replacement within short intervals.

The present inventive regenerator allows, overall, for the first time, the combination of the advantageous effect of regenerators with beds both with regard to better removability of baked-on silicon and the possibility of treating offgases which, in spite of the conversion products thereof in the course of oxidation, also comprise halogens.

This is also enabled by the inventive regenerator when the temperature goes below the acid dew point of the flue gas in the course of treatment in the regenerator as a result of further cooling of the offgases.

Accordingly, the present regenerator, for the first time, enables the thermal oxidation of haloorganosilicon compounds with greater exploitation of the heat content of the flue gas, and combines this with the possibility of nearly fully continuous operation.

Overall, the field of use of the inventive regenerator is thus distinctly widened compared to that from the prior art, and the regenerator is additionally more efficient than that from the prior art.

In yet a further preferred development of the inventive regenerator, at the base thereof, a discharge apparatus is present for discharge of slag formed from impurities in the course of thermal oxidation of the offgas. This discharge apparatus may in some cases also remove portions of the baked-on material which is detached from the stationary heat storage material or the bed in the operation of the regenerator from the regenerator. Particular preference is given to a discharge apparatus in the form of an internally cooled discharge screw. The lowest temperature typically exists at the base of the regenerator when, according to the first preferred development of the invention, the burner is provided in the top space.

The present invention relates not only to the above-described regenerator but also to a process for regenerative thermal oxidation of offgases comprising haloorganosilicon compounds, at least partly executed in the above-described inventive regenerator for preheating offgases and cooling flue gas, which is characterized in that an offgas to be cleaned at a temperature below 100° C. is heated in the inventive regenerator and then fed to an oxidation zone which is present in the regenerator and in which the haloorganosilicon compounds are oxidized to conversion products comprising $SiO_2$ and corresponding hydrogen halides at temperatures in the range from 800° C. to 1200° C. and the flue gas comprising the conversion products is subsequently cooled in the inventive regenerator, as a result of which the heat storage material of the regenerator is heated, and the flue gas comprising the conversion products after oxidation has a temperature below its acid dew point at the outlet from the regenerator.

The interplay of inlet temperature of the offgas, temperature in the oxidation zone and exit temperature of the cooled flue gas (which is below the acid dew point) results in a high exploitable temperature gradient in the regenerator which forms a medium between the gases to be heated and cooled, and which better exploits the reaction enthalpy from the oxidation than has been possible to date in processes according to the prior art, and the result of this is that the requirement for additional energy for external preheating is minimized This becomes possible by virtue of the temperature going below the acid dew point, which in turn only becomes possible to an industrially viable extent through the use of the inventive regenerator.

After startup of the inventive regenerator in the course of the process according to the invention described here, a characteristic temperature profile forms therein.

The process according to the invention is operated here in two alternating cycles. In a first cycle, the offgas is passed through the regenerator from the top downward, heated in the upper region of the regenerator and converted to flue gas in the middle, hot zone (the aforementioned oxidation zone) by oxidation of the haloorganosilicon compounds, as a result of which a flue gas temperature of 800° C. to 1200° C. is additionally attained by means of the reaction enthalpy released here.

This hot flue gas, in the course of further flow through the regenerator, heats the lower region of the regenerator, and both the stationary heat storage material and the bed of the regenerator therein.

In a second cycle, the flow direction of the offgas or flue gas is reversed, which means that the offgas is passed through the regenerator from the bottom upward; the flue gas then leaves at the upper end of the regenerator. It also becomes clear from this that, in connection with the present process according to the invention, the gas stream downstream of the aforementioned oxidation zone is referred to as flue gas, while the gas stream upstream of the aforementioned oxidation zone is referred to as offgas.

The above-described heat storage operations involve both the stationary heat storage material and the bed of the regenerator.

The flue gas formed in the oxidation at first has a temperature of about 800° C. to 1200° C. and is cooled in the course of the process according to the invention to a temperature of typically not more than 200 K above the inlet temperature of the offgas, but below the acid dew point of the flue gas.

Likewise, in the process according to the invention, the bed present in the regenerator is withdrawn continuously or periodically from the regenerator through an outlet present at the base and is fed back in through an inlet present at the top of the regenerator, after the bed has been freed of baked-on material in the meantime. It can be freed thereof, for example, by scraping it off, agitation or similar means.

In the operation of the process, in the two cycles described above, there is thus only a spatial variation in the maximum of the temperature profile in the regenerator about a fixed point. It is therefore also possible, as described above, to refer to a "characteristic temperature profile". This is essentially maintained in the operation of the process and its location shifts slightly from the top downward, or vice versa, in the regenerator with the respective cycles, in each case with regard to the temperature maximum (in the oxidation zone).

The present invention is described in detail hereinafter with reference to figures and examples, but without restricting it thereto.

Figure 1:
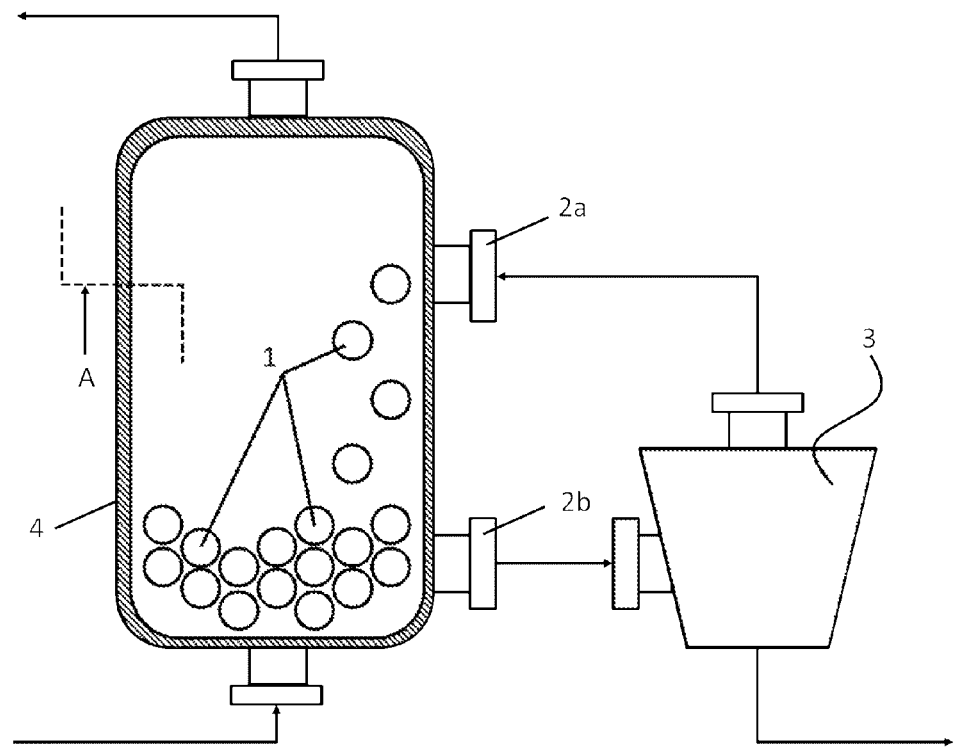
FIG. 1 shows an inventive regenerator with a separation apparatus (3) connected thereto via an outlet (2b) and inlet (2a). In the inventive regenerator, heat storage material is present in the form of a bed (1), and the regenerator has a multilayer coating (M). Likewise shown is a section (A) through the wall and the multilayer coating (M) of the regenerator.
Figure 2:
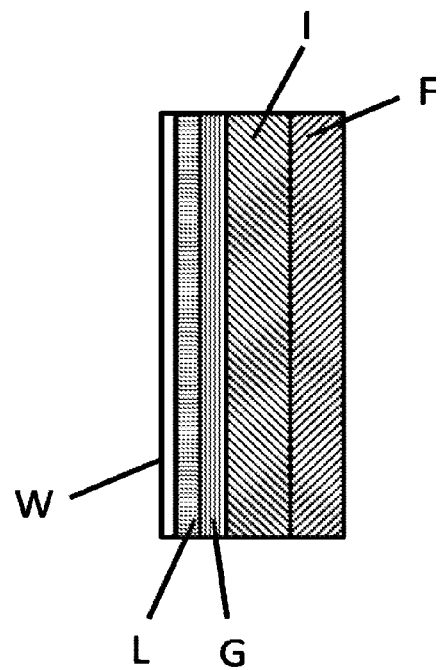

The multilayer coating (M) is shown in enlarged form in FIG. 2, along the section (A) in FIG. 1. On the wall of the regenerator (W), a fourth layer (L) according to a preferred development of the present invention, a third layer (G), a second layer (I) and a first layer (F) toward the interior of the regenerator can be seen.

Figure 3:
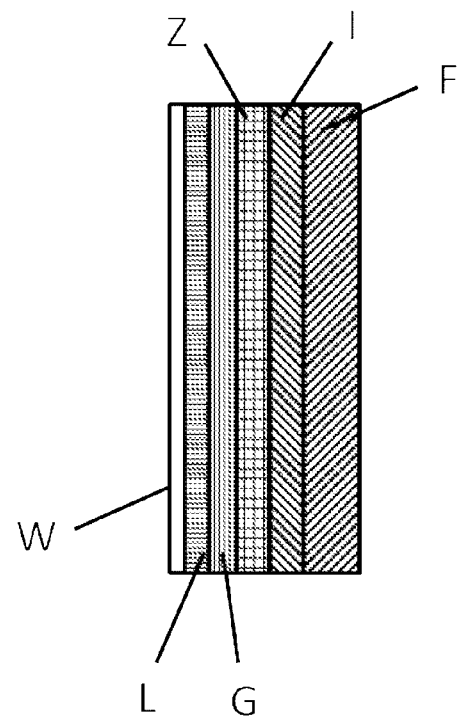

FIG. 3 shows a further preferred embodiment of the multilayer coating, which corresponds to that in FIG. 2 apart from the fact that a fifth layer (Z) is proceed here between the second layer (I) and the third layer.

EXAMPLES

Example 1

A cold offgas stream of 20,000 kg/h with a temperature of 30° C. and a sufficient level of haloorganosilicon compounds to lead to a further temperature increase of 60 K in the case of an oxidation temperature of 900° C. fed to a regenerator according to FIG. 1 from the bottom, in which 65 t of heat storage material are present in the form of stationary heat storage material, and 80 t of heat storage material in the form of a bed. These have a maximum temperature of 960° C. in about the middle of the regenerator. In the oxidation zone around the site of the aforementioned maximum temperature, the haloorganosilicon compounds are oxidized to form the flue gas comprising the $SiO_2$ and water conversion products, such as halogen acids. The flue gas is cooled again in the region of the bed above the oxidation zone.

The aforementioned offgas stream thus leaves the regenerator as flue gas at a temperature of 80° C.

As a result, the location of the aforementioned maximum temperature in the regenerator also shifts upward. The difference of 10 K between theoretically possible heating of the flue gas and actual exit temperature are caused by the heat loss—which is therefore low—through the regenerator wall. In this case, the outer wall of the regenerator (simple construction steel) has a temperature of only about 30° C. at the base and the top of the regenerator.

The reaction enthalpy of the oxidation has therefore been transferred nearly quantitatively to the heat storage material. The temperature of 80° C. is thus below the acid dew point of the flue gas, as a result of which portions of the flue gas leave the regenerator in liquid form, but are entrained by the volume flow rate of the remaining flue gas.

The temperature difference between cold offgas and flue gas is covered by the energy content of the oxidation of the offgas. No use of addition fuel is required.

The invention claimed is:

1. Regenerator for treatment of an offgas comprising haloorganosilicon compounds, the offgas being heated by means of a heat storage material in the form of a bed and an outlet for the heat storage material being present in the regenerator, this outlet being connected to a separation apparatus for removal of adhering oxidized silicon-containing material and the separation apparatus being connected to an inlet which allows the heat storage material to be fed back to the regenerator, wherein the regenerator is provided with an internal multilayer coating which comprises, in the sequence from the inside of the regenerator outward,
   a) a first layer of a ceramic material comprising aluminium oxide ($Al_2O_3$) and silicon oxide ($SiO_2$) in which aluminium oxide ($Al_2O_3$) and silicon oxide ($SiO_2$) are present at least partly as a mullitic and/or spinel crystal,
   b) a second layer of a further ceramic material comprising aluminium oxide ($Al_2O_3$) and silicon oxide ($SiO_2$) in which aluminium oxide ($Al_2O_3$) and silicon oxide ($SiO_2$) are present at least partly in the form of a mullitic crystal and this mullitic crystal is at least partly embedded into an amorphous phase of silicon oxide ($SiO_2$),
   c) a third layer comprising foamed, amorphous silicon oxide ($SiO_2$) with closed porosity and
   d) optionally a fourth layer comprising a vinyl ester resin with woven glass fabric and/or woven carbon fabric.

2. Regenerator according to claim 1, wherein the ceramic material of the first layer has a thermal conductivity in the range from 1 to 2.5 W/(m·K) and a coefficient of thermal expansion in the range from $3 \cdot 10^{-6}$ to $9 \cdot 10^{-6}$ $K^{-1}$.

3. Regenerator according to claim 1, wherein the further ceramic material of the second layer has a thermal conductivity in the range from 0.1 to 1 W/(m·K) and a coefficient of thermal expansion in the range from $1 \cdot 10^{-6}$ to $8 \cdot 10^{-6}$ $K^{-1}$.

4. Regenerator according to claim 1, wherein the foamed, amorphous silicon oxide ($SiO_2$) of the third layer has a thermal conductivity in the range from 0.3 to 0.1 W/(m·K) and a coefficient of thermal expansion in the range from about $5 \cdot 10^{-6}$ to $10^{-5}$ $K^{-1}$.

5. Regenerator according to claim 1 wherein the ceramic material of the first layer has a ratio of aluminium oxide to silicon oxide in the range from 0.6 to 2.

6. Regenerator according to claim 1, wherein the further ceramic material of the second layer has a ratio of aluminium oxide to silicon oxide in the range from 0.15 to 3.4.

7. Process for regenerative thermal oxidation of offgases comprising haloorganosilicon compounds, at least partly executed in a regenerator according to claim 1, wherein an offgas to be cleaned at a temperature below 100° C. is heated in the regenerator and then fed to an oxidation zone which is present in the regenerator and in which the haloorganosilicon compounds are oxidized to conversion products comprising $SiO_2$ and corresponding hydrogen halides at temperatures in the range from 800° C. to 1200° C. and the flue gas comprising the conversion products is subsequently cooled in the regenerator, as a result of which the heat storage material of the regenerator is heated, and the flue gas comprising the conversion products after oxidation has a temperature below its acid dew point at the outlet from the regenerator.

8. Process according to claim 7, wherein the flue gas formed after oxidation is cooled to a temperature of not more than 200 K above the inlet temperature of the offgas, but below the acid dew point of the flue gas.

9. Process according to claim 7, wherein the bed present in the regenerator is removed continuously or periodically at the base, freed of baked-on material, and fed in again at the top of the regenerator.

10. Process according to claim 7, operated in two alternating cycles, a first cycle involving passing the offgas through the regenerator from the top downward, heating it in the upper region of the regenerator and converting it to flue gas in the middle, hot oxidation zone by oxidation of the haloorganosilicon compounds, and then, in the course of further flow through the regenerator, heating the lower region of the regenerator, and a second cycle involving reversing the flow direction of the offgas or flue gas such that offgas is passed through the regenerator from the bottom upward and then flue gas leaves the upper end of the regenerator.

* * * * *